US008719321B2

(12) United States Patent
Fong et al.

(10) Patent No.: US 8,719,321 B2
(45) Date of Patent: May 6, 2014

(54) ADAPTIVE BLOCK-SIZE TRANSFORM USING LLMICT

(75) Inventors: Chi Keung Fong, Hong Kong (HK); Wai-Kuen Cham, Hong Kong (HK)

(73) Assignee: Hong Kong Applied Science and Technology Research Institute Company Limited, Hong Kong Science Park, Shatin, New Territories, Hong Kong (CN)

( * ) Notice: Subject to any disclaimer, the term of this patent is extended or adjusted under 35 U.S.C. 154(b) by 393 days.

(21) Appl. No.: 13/316,556

(22) Filed: Dec. 11, 2011

(65) Prior Publication Data
US 2013/0151575 A1 Jun. 13, 2013

(51) Int. Cl.
G06F 7/00 (2006.01)
(52) U.S. Cl.
USPC .......................................................... 708/203

(58) Field of Classification Search
None
See application file for complete search history.

(56) References Cited

U.S. PATENT DOCUMENTS

| 7,418,045 | B2* | 8/2008 | Willink | 375/260 |
|---|---|---|---|---|
| 8,228,983 | B2* | 7/2012 | Cham et al. | 375/240.03 |
| 2008/0144751 | A1* | 6/2008 | Xia et al. | 375/347 |
| 2011/0153699 | A1* | 6/2011 | Reznik et al. | 708/205 |
| 2013/0151575 | A1* | 6/2013 | Fong et al. | 708/203 |

* cited by examiner

Primary Examiner — David H Malzahn
(74) Attorney, Agent, or Firm — Ella Cheong Hong Kong; Sam T. Yip

(57) ABSTRACT

The LLMICT transform matrices are orthogonal, hence their inverses are their transpose. The LLMICT transform matrices are integer matrices, which can be implemented with high precision eliminating the drift error in video coding. The fast algorithms for the LLMICT transform are found, thus allowing a lower requirement on computation hardware. The LLMICT is also found to have high transform coding gain due to its similarity to the DCT.

4 Claims, 2 Drawing Sheets

ADAPTIVE BLOCK-SIZE TRANSFORM USING LLMICT

CROSS-REFERENCES TO RELATED APPLICATIONS

This application is related to U.S. patent application Ser. No. 11/950,182, filed Dec. 4, 2007, the disclosure of which is incorporated herein by reference in its entirety.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The presently claimed invention relates generally to multimedia content delivery. Specifically, the presently claimed invention relates to the method and system of data compression of a multimedia content signal. More specifically, the presently claimed invention relates to transform coding in lossy compression of audio, image, and video data.

BACKGROUND

Due to the limited network bandwidth, most audio, image and video media are compacted before being broadcast in television networks or transmitted through the Internet. Compression is also needed for practical storage of large amount of information such as a high quality motion video. The current lossless compression techniques cannot achieve a high enough compression ratio for the effective transmission of multimedia content in television broadcasting or over the Internet. In contrast, lossy compression yields a much higher compression ratio than that of lossless compression owing to the fact that some information of the source content is discarded during compression and that the decompressed content is not exactly the same as the source content, but a close approximation of it. However, with a conservative compression ratio, the decompressed content and the source content can appear perceptually indistinguishable. Many known implementations of lossy compression are included in existing industry standards such as: JPEG, JPEG 2000, MPEG-1, MPEG-2, and H.264/MPEG-4 or AVS.

Most lossy compression implementations apply some form of transform coding techniques. Transform coding is used to convert input signal data, such as spatial image pixel values to transform coefficient values. The transform coding process can be viewed as transforming the raw media content data from one domain to another domain. For example, an audio bit stream expressed as amplitude levels over time can be expressed as frequency spectrum over time. Lossy compression of the data in the frequency spectrum over time domain becomes a selective removal of the least significant data rather than losses across the board. The removal selection is made in a way that the audio bit stream reconstructed from the fewer data is to be perceived without detectable differences as compared to the source audio bit stream.

Another way to remove the less-significant data is through a quantization process. A quantizer maps an input data value to a quantized value within a reduced value range, usually reducing the precision of the data. And because the quantized data has fewer possible values, it can be represented using fewer bits than the input data. The decompression then applies the reversed transform coding on the quantized data to reconstruct an approximation of the original content. In typical commercial digital audio/video playback systems, such as the MPEG video software programs and MP3 music players, the compression-decompression processes are executed in a pair of codec and decoder.

It is the general goal of a transform coding scheme to convert an input content data into transform coefficients of as few significant ones as possible, such that the lesser significant coefficients can be discarded but still allowing close approximate reconstruction of the original content from the fewer data. This concept can be described as packing the input signal energy or information in as few number of transform coefficients as possible. In addition, the transform should be reversible. Also, the transform should be computationally tractable.

Block-based transforms are particular well suited for the compression of motion videos. A block-based transform operates on blocks of N×N image data, thus a motion video is processed frame by frame and each frame in units of a block. Some of the block-based transforms are the Karhunen-Loeve Transform (KLT), Singular Value Decomposition (SVD), and the Discrete Cosine Transform (DCT).

The DCT is featured in the H.264/MPEG-4 standard. DCT with block sizes of 4×4 and 8×8 with scaled integer transfer matrices, which is named the Integer Cosine Transfer (ICT), have been adopted by the standard. It is described in Siwei Ma, Xiaopeng Fan, and Wen Gao, "Low Complexity Integer Transform and High Definition Coding", Institute of Computing Technology, Chinese Academy of Sciences, Beijing, China, the content of which is incorporated herein by reference in its entirety. With high definition videos becoming more prevalent, larger block size is desired as it can more efficiently process the large number of frame image pixels. Although order-16 DCTs have been found, their fast algorithms are not known. Other transform coding schemes using 16×16 and 32×32 sized blocks have been proposed to the industry standard bodies such as the Audio Video Standard (AVS) and the Video Coding Experts Group (VCEG). The key issue is to determine which transform coding scheme to be adopted in the standards.

One candidate proposed to the AVS is the SICT Transform Coding disclosed in the U.S. patent application Ser. No. 11/950,182, filed Dec. 4, 2007. Another is the LKT Transform Coding, which is proposed to the VCEG as the new High Efficiency Video Coding (HEVC) standard, and is documented in Bumshik Lee, Munchurl Kim, Changseob Park, Sangjin Hahm, and Injoon Cho, "A 16×16 Transform Kernel with Quantization for (Ultra) High Definition Video Coding", VCEG, April 2009. Yet another HEVC candidate is disclosed in R. Joshi, Y. Reznik, and M. Karczewicz, "Simplified Transforms for Extended Block Sizes", VCEG, July 2009.

SUMMARY

It is an objective of the presently claimed invention to provide a method and a system for the implementation of an adaptive block-sized transform coding using LLMICT, which is a more superior transform coding than the known proposed candidates for standard adoption.

The LLMICT transform matrices are orthogonal, hence their inverses are their transposes. The LLMICT transform matrices are integer matrices, which can be implemented with high precision eliminating the drift error in video coding. The fast algorithms for the LLMICT transform are found, thus allowing a lower requirement on computation hardware. The LLMICT is also found to have high transform coding gain due to its similarity to the DCT.

For the first embodiment of the presently claimed invention, $E_{LLMICT-A1}$ represents the transform matrix.

FIG. 2 illustrates the flow diagram for performing a one dimensional order-16 transform with the fast algorithm according to a second embodiment of the claimed invention.

DETAILED DESCRIPTION

In the following description, methods and systems for the implementation of an adaptive block-sized transform coding using LLMICT are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

$$E_{LLMICT-A1} = \begin{bmatrix} 256 & 256 & 256 & 256 & 256 & 256 & 256 & 256 & 256 & 256 & 256 & 256 & 256 & 256 & 256 & 256 \\ 344 & 336 & 304 & 272 & 216 & 168 & 88 & 48 & -48 & -88 & -168 & -216 & -272 & -304 & -336 & -344 \\ 320 & 288 & 192 & 64 & -64 & -192 & -288 & -320 & -320 & -288 & -192 & -64 & 64 & 192 & 288 & 320 \\ 319 & 203 & 33 & -157 & -291 & -329 & -261 & -87 & 87 & 261 & 329 & 291 & 157 & -33 & -203 & -319 \\ 320 & 128 & -128 & -320 & -320 & -128 & 128 & 320 & 320 & 128 & -128 & -320 & -320 & -128 & 128 & 320 \\ 283 & 49 & -261 & -319 & -87 & 203 & 327 & 171 & -171 & -327 & -203 & 87 & 319 & 261 & -49 & -283 \\ 288 & -64 & -320 & -192 & 192 & 320 & 64 & -288 & -288 & 64 & 320 & 192 & -192 & -320 & -64 & 288 \\ 196 & -124 & -236 & 28 & 244 & 68 & -212 & -148 & 148 & 212 & -68 & -244 & -28 & 236 & 124 & -196 \\ 256 & -256 & -256 & 256 & 256 & -256 & -256 & 256 & 256 & -256 & -256 & 256 & 256 & -256 & -256 & 256 \\ 148 & -212 & -68 & 244 & -28 & -236 & 124 & 196 & -196 & -124 & 236 & 28 & -244 & 68 & 212 & -148 \\ 192 & -320 & 64 & 288 & -288 & -64 & 320 & -192 & -192 & 320 & -64 & -288 & 288 & 64 & -320 & 192 \\ 171 & -327 & 203 & 87 & -319 & 261 & 49 & -283 & 283 & -49 & -261 & 319 & -87 & -203 & 327 & -171 \\ 128 & -320 & 320 & -128 & -128 & 320 & -320 & 128 & 128 & -320 & 320 & -128 & -128 & 320 & -320 & 128 \\ 87 & -261 & 329 & -291 & 157 & 33 & -203 & 319 & -319 & 203 & -33 & -157 & 291 & -329 & 261 & -87 \\ 64 & -192 & 288 & -320 & 320 & -288 & 192 & -64 & -64 & 192 & -288 & 320 & -320 & 288 & -192 & 64 \\ 48 & -88 & 168 & -216 & 272 & -304 & 336 & -344 & 344 & -336 & 304 & -272 & 216 & -168 & 88 & -48 \end{bmatrix}$$

For the second embodiment of the presently claimed invention, $E_{LLMICT-B1}$ represents the transform matrix.

$$E_{LLMICT-B1} = \begin{bmatrix} 32 & 32 & 32 & 32 & 32 & 32 & 32 & 32 & 32 & 32 & 32 & 32 & 32 & 32 & 32 & 32 \\ 25 & 25 & 23 & 19 & 17 & 11 & 5 & 5 & -5 & -5 & -11 & -17 & -19 & -23 & -25 & -25 \\ 40 & 36 & 24 & 8 & -8 & -24 & -36 & -40 & -40 & -36 & -24 & -8 & 8 & 24 & 36 & 40 \\ 40 & 20 & 5 & -20 & -35 & -40 & -35 & -5 & 5 & 35 & 40 & 35 & 20 & -5 & -20 & -40 \\ 40 & 16 & -16 & -40 & -40 & -16 & 16 & 40 & 40 & 16 & -16 & -40 & -40 & -16 & 16 & 40 \\ 35 & 5 & -28 & -37 & -16 & 29 & 40 & 20 & -20 & -40 & -29 & 16 & 37 & 28 & -5 & -35 \\ 36 & -8 & -40 & -24 & 24 & 40 & 8 & -36 & -36 & 8 & 40 & 24 & -24 & -40 & -8 & 36 \\ 30 & -20 & -34 & 2 & 36 & 12 & -30 & -20 & 20 & 30 & -12 & -36 & -2 & 34 & 20 & -30 \\ 32 & -32 & -32 & 32 & 32 & -32 & -32 & 32 & 32 & -32 & -32 & 32 & 32 & -32 & -32 & 32 \\ 20 & -30 & -12 & 36 & -2 & -34 & 20 & 30 & -30 & -20 & 34 & 2 & -36 & 12 & 30 & -20 \\ 24 & -40 & 8 & 36 & -36 & -8 & 40 & -24 & -24 & 40 & -8 & -36 & 16 & 8 & -40 & 24 \\ 20 & -40 & 29 & 16 & -37 & 28 & 5 & -35 & 35 & -5 & -28 & 37 & -16 & -23 & 40 & -20 \\ 16 & -40 & 40 & -16 & -16 & 40 & -40 & 16 & 16 & -40 & 40 & -16 & 35 & 40 & -40 & 16 \\ 5 & -35 & 40 & -35 & 20 & 5 & -20 & 40 & -40 & 20 & -5 & -20 & 35 & -40 & 35 & -5 \\ 8 & -24 & 36 & -40 & -40 & -36 & 24 & -8 & -8 & 24 & -36 & 40 & -40 & 36 & -24 & 8 \\ 5 & -5 & 11 & -17 & 19 & -23 & 25 & -25 & 25 & -25 & 23 & -19 & 17 & 11 & 5 & -5 \end{bmatrix}$$

BRIEF DESCRIPTION OF THE DRAWINGS

Embodiments of the invention are described in more detail hereinafter with reference to the drawings, in which:

FIG. 1 illustrates the flow diagram for performing a one dimensional order-16 transform with the fast algorithm according to a first embodiment of the claimed invention; and Transform coding operates on X, a block of N×N sample data $x_{ij}$ for i ∈ {0, ..., N−1} and j ∈ {0, ..., N−1} where i is the row index and j is the column index of the sample data in the N×N block. X typically is a section of a raw image, a frame of a motion video, or some form data representation of the raw image or frame of a motion video such as the residual values from a motion prediction process. The result of the forward transform coding is Y, a block of N×N transform coefficients $y_{ij}$ for $i \in \{0, \ldots, N-1\}$ and $j \in \{0, \ldots, N-1\}$ where i is the row index and j is the column index of the coefficient. E is the N×N transform matrix containing elements Eij for $i \in \{0, \ldots, N-1\}$ and $j \in \{0, \ldots, N-1\}$ where i is the row index and j is the column index of the transform matrix element. In the case where E is orthogonal, the inverse of the E, $E^{-1}$ is its transpose, $E^T$. The forward transform can be mathematically represented by:

$$Y = EXE^T$$

Figure 1:
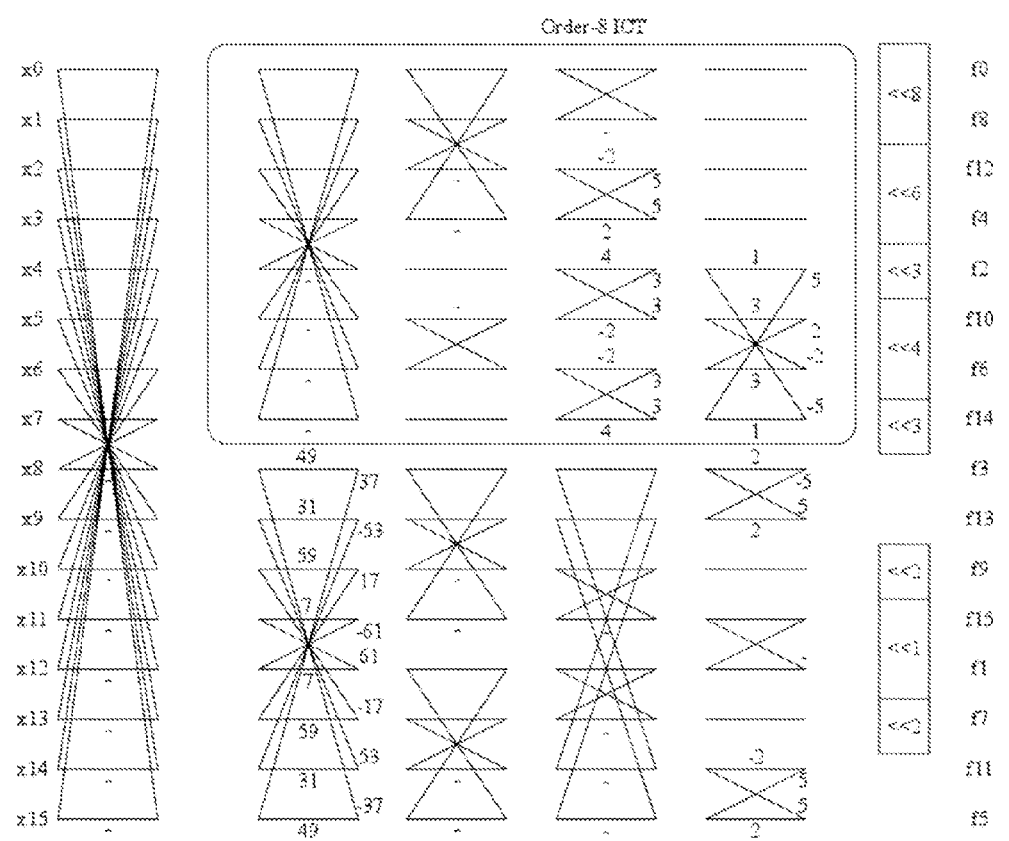

The inverse transform can be represented by:

$$X = E^T Y E$$

For LLMICT transform coding, the first embodiment has a 16×16 transform matrix $E_{LLMICT-A1}$, where:

One way to compare the performance of different orthogonal transform coding schemes is by comparing their coding gain $G_N$, which a function of the total distortion on the input data and is given by:

$$G_N = 10 \cdot \log_{10} \frac{\frac{1}{N} \sum_{n=0}^{N-1} \sigma_n^2}{\left( \prod_{n=0}^{N-1} \sigma_n^2 \right)^{1/N}}$$

$\sigma_n^2$ is the variance of the $n^{th}$ transform coefficient. The following is the comparison of coding gain $G_N$, in units of dB, of various transform coding schemes with different values of correlation coefficient ρ:

| ρ | LLMICT-A1 | LLMICT-B1 | SICT | LKT | JRKT |
|---|---|---|---|---|---|
| 0.9 | 6.712 | 6.631 | 6.088 | 6.539 | 6.711 |
| 0.8 | 4.108 | 4.052 | 3.600 | 3.995 | 4.106 |
| 0.7 | 2.695 | 2.654 | 2.269 | 2.622 | 2.692 |

$$E_{LLMICT-A1} = \begin{bmatrix}
256 & 256 & 256 & 256 & 256 & 256 & 256 & 256 & 256 & 256 & 256 & 256 & 256 & 256 & 256 & 256 \\
344 & 336 & 304 & 272 & 216 & 168 & 88 & 48 & -48 & -88 & -168 & -216 & -272 & -304 & -336 & -344 \\
320 & 288 & 192 & 64 & -64 & -192 & -288 & -320 & -320 & -288 & -192 & -64 & 64 & 192 & 288 & 320 \\
319 & 203 & 33 & -157 & -291 & -329 & -261 & -87 & 87 & 261 & 329 & 291 & 157 & -33 & -203 & -319 \\
320 & 128 & -128 & -320 & -320 & -128 & 128 & 320 & 320 & 128 & -128 & -320 & -320 & -128 & 128 & 320 \\
283 & 49 & -261 & -319 & -87 & 203 & 327 & 171 & -171 & -327 & -203 & 87 & 319 & 261 & -49 & -283 \\
288 & -64 & -320 & -192 & 192 & 320 & 64 & -288 & -288 & 64 & 320 & 192 & -192 & -320 & -64 & 288 \\
196 & -124 & -236 & 28 & 244 & 68 & -212 & -148 & 148 & 212 & -68 & -244 & -28 & 236 & 124 & -196 \\
256 & -256 & -256 & 256 & 256 & -256 & -256 & 256 & 256 & -256 & -256 & 256 & 256 & -256 & -256 & 256 \\
148 & -212 & -68 & 244 & -28 & -236 & 124 & 196 & -196 & -124 & 236 & 28 & -244 & 68 & 212 & -148 \\
192 & -320 & 64 & 288 & -288 & -64 & 320 & -192 & -192 & 320 & -64 & -288 & 288 & 64 & -320 & 192 \\
171 & -327 & 203 & 87 & -319 & 261 & 49 & -283 & 283 & -49 & -261 & 319 & -87 & -203 & 327 & -171 \\
128 & -320 & 320 & -128 & -128 & 320 & -320 & 128 & 128 & -320 & 320 & -128 & -128 & 320 & -320 & 128 \\
87 & -261 & 329 & -291 & 157 & 33 & -203 & 319 & -319 & 203 & -33 & -157 & 291 & -329 & 261 & -87 \\
64 & -192 & 288 & -320 & 320 & -288 & 192 & -64 & -64 & 192 & -288 & 320 & -320 & 288 & -192 & 64 \\
48 & -88 & 168 & -216 & 272 & -304 & 336 & -344 & 344 & -336 & 304 & -272 & 216 & -168 & 88 & -48
\end{bmatrix}$$

For LLMICT transform coding, the second embodiment has a 16×16 transform matrix $E_{LLMICT-B1}$, where:

$$E_{LLMICT-B1} = \begin{bmatrix}
32 & 32 & 32 & 32 & 32 & 32 & 32 & 32 & 32 & 32 & 32 & 32 & 32 & 32 & 32 & 32 \\
25 & 25 & 23 & 19 & 17 & 11 & 5 & 5 & -5 & -5 & -11 & -17 & -19 & -23 & -25 & -25 \\
40 & 36 & 24 & 8 & -8 & -24 & -36 & -40 & -40 & -36 & -24 & -8 & 8 & 24 & 36 & 40 \\
40 & 20 & 5 & -20 & -35 & -40 & -35 & -5 & 5 & 35 & 40 & 35 & 20 & -5 & -20 & -40 \\
40 & 16 & -16 & -40 & -40 & -16 & 16 & 40 & 40 & 16 & -16 & -40 & -40 & -16 & 16 & 40 \\
35 & 5 & -28 & -37 & -16 & 29 & 40 & 20 & -20 & -40 & -29 & 16 & 37 & 28 & -5 & -35 \\
36 & -8 & -40 & -24 & 24 & 40 & 8 & -36 & -36 & 8 & 40 & 24 & -24 & -40 & -8 & 36 \\
30 & -20 & -34 & 2 & 36 & 12 & -30 & -20 & 20 & 30 & -12 & -36 & -2 & 34 & 20 & -30 \\
32 & -32 & -32 & 32 & 32 & -32 & -32 & 32 & 32 & -32 & -32 & 32 & 32 & -32 & -32 & 32 \\
20 & -30 & -12 & 36 & -2 & -34 & 20 & 30 & -30 & -20 & 34 & 2 & -36 & 12 & 30 & -20 \\
24 & -40 & 8 & 36 & -36 & -8 & 40 & -24 & -24 & 40 & -8 & -36 & 16 & 8 & -40 & 24 \\
20 & -40 & 29 & 16 & -37 & 28 & 5 & -35 & 35 & -5 & -28 & 37 & -16 & -23 & 40 & -20 \\
16 & -40 & 40 & -16 & -16 & 40 & -40 & 16 & 16 & -40 & 40 & -16 & 35 & 40 & -40 & 16 \\
5 & -35 & 40 & -35 & 20 & 5 & -20 & 40 & -40 & 20 & -5 & -20 & 35 & -40 & 35 & -5 \\
8 & -24 & 36 & -40 & -40 & -36 & 24 & -8 & -8 & 24 & -36 & 40 & -40 & 36 & -24 & 8 \\
5 & -5 & 11 & -17 & 19 & -23 & 25 & -25 & 25 & -25 & 23 & -19 & 17 & 11 & 5 & -5
\end{bmatrix}$$

As can be seem, both LLMICT embodiments have higher coding gains, thus better energy packing ability, than the other candidate transform coding schemes.

Figure 2:
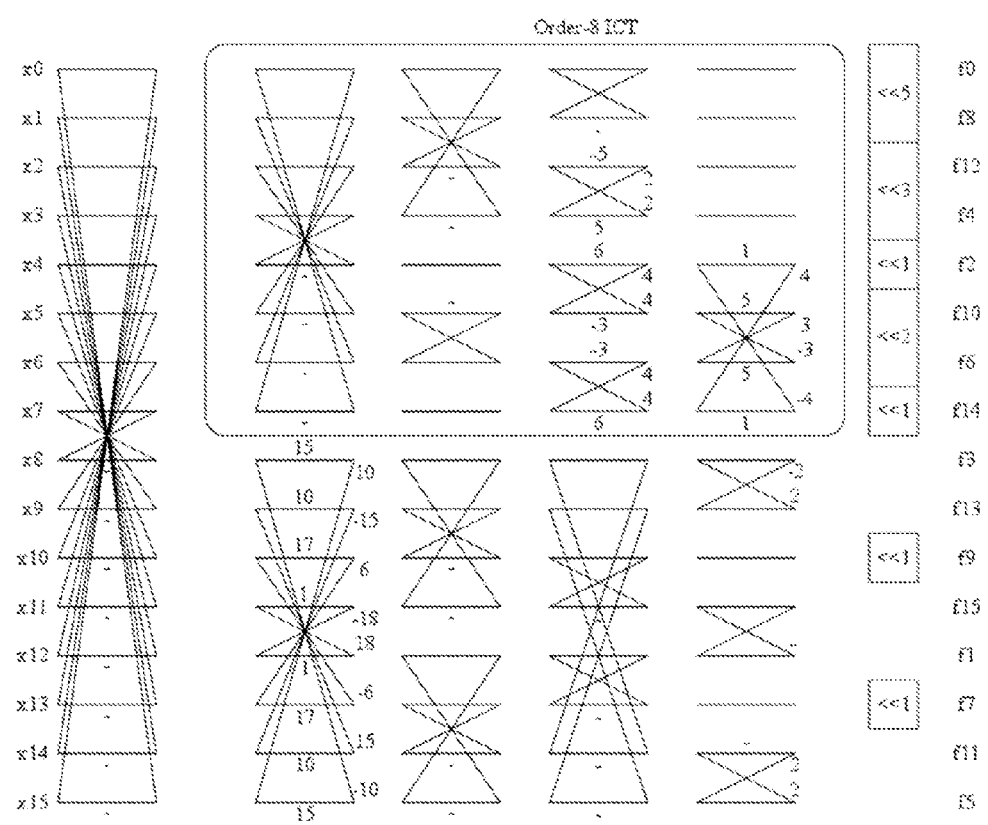

FIG. 1 is the flow diagram illustrating the hardware or software execution of LLMICT-A1 according to the fast algorithm found. FIG. 2 is the flow diagram illustrating the hardware or software execution of LLMICT-B1 according to the fast algorithm found. In both figures, x0, x1, ..., x15 are the elements of the 1×N vector of the input sample data and f0, f1, ..., f15 are the corresponding elements of the 1×N vector of the transform coefficients. In both LLMICT embodiments' fast algorithms, the number of addition and shift operations performed is competitive in comparison with other candidate transform coding schemes as shown below:

|  | LLMICT-A1 | LLMICT-B1 | SICT | LKT | JRKT |
|---|---|---|---|---|---|
| # of Additions | 110 | 92 | 92 | 148 | 120 |
| # of Shifts | 50 | 48 | 32 | 58 | 64 |
| Total # of Operations | 160 | 140 | 124 | 206 | 184 |

As a result the average computation time is also relatively competitive, as can be seen in the computation time for transform coding a 1,000,000 sets of 16×16 input random data:

|  | LLMICT-A1 | LLMICT-B1 | SICT | LKT | JRKT |
|---|---|---|---|---|---|
| Computation Time | 1.460 s | 1.460 s | 1.304 s | 1.727 s | 1.646 s |

The LLMICT is the first known transform coding family whose members satisfy all the following criteria:

1. Their transform matrices are orthogonal, thus their inverses are their transposes.

2. They are integer transforms, thus can be implemented with high precision eliminating the drift error in video coding.

3. They are very similar to DCT, thus having high transform coding gains.

4. They can be computed using fast algorithms, thus require less computational resources and time.

5. The family has members of order-4, 8, 16, 32, and possibly higher order.

Typically, an electrical signal encoded with data is subjected to the process described above; the output will be a compressed signal. A compressed signal is then input to the inverse process to substantially reproduce the original data-encoded electrical signal.

The embodiments disclosed herein may be implemented using general purpose or specialized computing devices, computer processors, or electronic circuitries including but not limited to digital signal processors (DSP), application specific integrated circuits (ASIC), field programmable gate arrays (FPGA), and other programmable logic devices configured or programmed according to the teachings of the present disclosure. Computer instructions or software codes running in the general purpose or specialized computing devices, computer processors, or programmable logic devices can readily be prepared by practitioners skilled in the software or electronic art based on the teachings of the present disclosure.

In some embodiments, the present invention includes computer storage media having computer instructions or software codes stored therein which can be used to program computers or microprocessors to perform any of therein processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for data compression/decompression comprising subjecting an electrical signal encoded with data to a computer processor executable method for transforming an input data set represented by a 16 by 16 matrix of a first domain into an output data set represented by a 16 by 16 matrix of a second domain, comprising the steps of:

obtaining by a computer processor from a persistent storage media a first 16 by 16 transfer matrix, wherein the first 16 by 16 transfer matrix is orthogonal;

computing by a computer processor a transpose of the first 16 by 16 transfer matrix;

computing by a computer processor an intermediate result by matrix-multiplying the input data set by the transpose of the first 16 by 16 transfer matrix; and computing by a computer processor the output data set by matrix-multiplying the first 16 by 16 transfer matrix by the intermediate result;

wherein the first 16 by 16 transfer matrix is $$\begin{bmatrix}
256 & 256 & 256 & 256 & 256 & 256 & 256 & 256 \\
344 & 336 & 304 & 272 & 216 & 168 & 88 & 48 \\
320 & 288 & 192 & 64 & -64 & -192 & -288 & -320 \\
319 & 203 & 33 & -157 & -291 & -329 & -261 & -87 \\
320 & 128 & -128 & -320 & -320 & -128 & 128 & 320 \\
283 & 49 & -261 & -319 & -87 & 203 & 327 & 171 \\
288 & -64 & -320 & -192 & 192 & 320 & 64 & -288 \\
196 & -124 & -236 & 28 & 244 & 68 & -212 & -148 \\
256 & -256 & -256 & 256 & 256 & -256 & -256 & 256 \\
148 & -212 & -68 & 244 & -28 & -236 & 124 & 196 \\
192 & -320 & 64 & 288 & -288 & -64 & 320 & -192 \\
171 & -327 & 203 & 87 & -319 & 261 & 49 & -283 \\
128 & -320 & 320 & -128 & -128 & 320 & -320 & 128 \\
87 & -261 & 329 & -291 & 157 & 33 & -203 & 319 \\
64 & -192 & 288 & -320 & 320 & -288 & 192 & -64 \\
48 & -88 & 168 & -216 & 272 & -304 & 336 & -344
\end{bmatrix}$$

$$\begin{bmatrix}
256 & 256 & 256 & 256 & 256 & 256 & 256 & 256 \\
-48 & -88 & -168 & -216 & -272 & -304 & -336 & -344 \\
-320 & -288 & -192 & -64 & 64 & 192 & 288 & 320 \\
87 & 261 & 329 & 291 & 157 & -33 & -203 & -319 \\
320 & 128 & -128 & -320 & -320 & -128 & 128 & 320 \\
-171 & -327 & -203 & 87 & 319 & 261 & -49 & -283 \\
-288 & 64 & 320 & 192 & -192 & -320 & -64 & 288 \\
148 & 212 & -68 & -244 & -28 & 236 & 124 & -196 \\
256 & -256 & -256 & 256 & 256 & -256 & -256 & 256 \\
-196 & -124 & 236 & 28 & -244 & 68 & 212 & -148 \\
-192 & 320 & -64 & -288 & 288 & 64 & -320 & 192 \\
283 & -49 & -261 & 319 & -87 & -203 & 327 & -171 \\
128 & -320 & 320 & -128 & -128 & 320 & -320 & 128 \\
-319 & 203 & -33 & -157 & 291 & -329 & 261 & -87 \\
-64 & 192 & -288 & 320 & -320 & 288 & -192 & 64 \\
344 & -336 & 304 & 272 & 216 & -168 & 88 & -48
\end{bmatrix}.$$

2. The method of claim 1, wherein the computer processor executable method for transforming the input data set represented by the 16 by 16 matrix of the first domain into the output data set represented by the 16 by 16 matrix of the second domain being executed using a fast algorithms comprising 110 additions and 50 shifts operations following a first operation flow on each of the column vector of the input data set.

3. A method for data compression/decompression comprising subjecting an electrical signal encoded with data to a computer processor executable method for transforming an input data set represented by a 16 by 16 matrix of a first domain into an output data set represented by a 16 by 16 matrix of a second domain, comprising the steps of:

obtaining by a computer processor from a persistent storage media a first 16 by 16 transfer matrix, wherein the first 16 by 16 transfer matrix is orthogonal;

computing by a computer processor a transpose of the first 16 by 16 transfer matrix;

computing by a computer processor an intermediate result by matrix-multiplying the input data set by the transpose of the first 16 by 16 transfer matrix; and computing by a computer processor the output data set by matrix-multiplying the first 16 by 16 transfer matrix by the intermediate result;

wherein the first 16 by 16 transfer matrix is $$\begin{bmatrix}
32 & 32 & 32 & 32 & 32 & 32 & 32 & 32 & 32 & 32 & 32 & 32 & 32 & 32 & 32 & 32 \\
25 & 25 & 23 & 19 & 17 & 11 & 5 & 5 & -5 & -5 & -11 & -17 & -19 & -23 & -25 & -25 \\
40 & 36 & 24 & 8 & -8 & -24 & -36 & -40 & -40 & -36 & -24 & -8 & 8 & 24 & 36 & 40 \\
40 & 20 & 5 & -20 & -35 & -40 & -35 & -5 & 5 & 35 & 40 & 35 & 20 & -5 & -20 & -40 \\
40 & 16 & -16 & -40 & -40 & -16 & 16 & 40 & 40 & 16 & -16 & -40 & -40 & -16 & 16 & 40 \\
35 & 5 & -28 & -37 & -16 & 29 & 40 & 20 & -20 & -40 & -29 & 16 & 37 & 28 & -5 & -35 \\
36 & -8 & -40 & -24 & 24 & 40 & 8 & -36 & -36 & 8 & 40 & 24 & -24 & -40 & -8 & 36 \\
30 & -20 & -34 & 2 & 36 & 12 & -30 & -20 & 20 & 30 & -12 & -36 & -2 & 34 & 20 & -30 \\
32 & -32 & -32 & 32 & 32 & -32 & -32 & 32 & 32 & -32 & -32 & 32 & 32 & -32 & -32 & 32 \\
20 & -30 & -12 & 36 & -2 & -34 & 20 & 30 & -30 & -20 & 34 & 2 & -36 & 12 & 30 & -20 \\
24 & -40 & 8 & 36 & -36 & -8 & 40 & -24 & -24 & 40 & -8 & -36 & 16 & 8 & -40 & 24 \\
20 & -40 & 29 & 16 & -37 & 28 & 5 & -35 & 35 & -5 & -28 & 37 & -16 & -23 & 40 & -20 \\
16 & -40 & 40 & -16 & -16 & 40 & -40 & 16 & 16 & -40 & 40 & -16 & 35 & 40 & -40 & 16 \\
5 & -35 & 40 & -35 & 20 & 5 & -20 & 40 & -40 & 20 & -5 & -20 & 35 & -40 & 35 & -5 \\
8 & -24 & 36 & -40 & -40 & -36 & 24 & -8 & -8 & 24 & -36 & 40 & -40 & 36 & -24 & 8 \\
5 & -5 & 11 & -17 & 19 & -23 & 25 & -25 & 25 & -25 & 23 & -19 & 17 & 11 & 5 & -5
\end{bmatrix}.$$

4. The method of claim 3, wherein the computer processor executable method for transforming the input data set represented by the 16 by 16 matrix of the first domain into the output data set represented by the 16 by 16 matrix of the second domain being executed using a fast algorithms comprising 92 additions and 48 shifts operations following a first operation flow on each of the column vector of the input data set.

* * * * *